United States Patent
Wang et al.

(10) Patent No.: US 10,219,269 B2
(45) Date of Patent: Feb. 26, 2019

(54) MIXED SIZE EXPRESSION PEER DISCOVERY IN WWAN

(71) Applicant: QUALCOMM Incorporated, San Diego, CA (US)

(72) Inventors: Hua Wang, Basking Ridge, NJ (US); Shailesh Patil, Bridgewater, NJ (US); Saurabha Rangrao Tavildar, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 873 days.

(21) Appl. No.: 14/168,266

(22) Filed: Jan. 30, 2014

(65) Prior Publication Data

US 2015/0215846 A1  Jul. 30, 2015

(51) Int. Cl.
H04W 72/04 (2009.01)
H04L 5/00 (2006.01)
H04W 8/00 (2009.01)

(52) U.S. Cl.
CPC ....... *H04W 72/0446* (2013.01); *H04L 5/0012* (2013.01); *H04L 5/0044* (2013.01); *H04L 5/0094* (2013.01); *H04W 8/005* (2013.01)

(58) Field of Classification Search
CPC .............. H04W 72/0446; H04W 8/005; H04L 5/0012; H04L 5/0044; H04L 5/0094; H04L 5/0048
See application file for complete search history.

(56) References Cited

U.S. PATENT DOCUMENTS

| 8,121,097 B2 | 2/2012 | Li et al. |
| 2009/0010179 A1 | 1/2009 | Laroia et al. |

(Continued)

FOREIGN PATENT DOCUMENTS

| JP | 2015089045 A | 5/2015 |
| JP | 2016536828 A | 11/2016 |
| WO | 2010053686 A1 | 5/2010 |

OTHER PUBLICATIONS

Asustek: "Method of resource allocation for D2D discovery", 3GPP Draft; R1-135617 Method of Resource Allocation for D2D Discovery, 3rd Generation Partnership Project (3GPP), Mobile Competence Centre, vol. RAN WG1, Nov. 13, 2013 (Nov. 13, 2013), 9 Pages, XP050735274, Sophia-Antipolis Cedex, France, Retrieved from the Internet: URL: http://www.3gpp.org/ftp/Meetings_3GPP_SYNC/RAN/RAN1/Docs/ [retrieved on Nov. 13, 2013] Section 4, figures 2,7.

(Continued)

*Primary Examiner* — Noel R Beharry
*Assistant Examiner* — Kevin H Lee
(74) *Attorney, Agent, or Firm* — Arent Fox, LLP

(57) ABSTRACT

A method, an apparatus, and a computer program product for wireless communication are provided. The apparatus may be a UE. The UE determines a second set of resource block pairs on which to transmit a peer discovery message in a second time cycle based on a mapping of a first set of resource block pairs in a first time cycle to the second set of resource block pairs in the second time cycle. The mapping is a one-to-one mapping between each resource block pair in the first set of resource block pairs to a corresponding resource block pair in the second set of resource block pairs. Resource block pairs in the first set of resource block pairs may be in adjacent allocated resources. The UE transmits the (Continued)

peer discovery message in the determined second set of resource block pairs.

18 Claims, 17 Drawing Sheets

(56) References Cited

U.S. PATENT DOCUMENTS

| | | | |
|---|---|---|---|
| 2013/0322276 A1 | 12/2013 | Pelletier et al. | |
| 2016/0007269 A1* | 1/2016 | Chae | H04L 5/0048 370/330 |
| 2016/0007335 A1* | 1/2016 | Chun | H04W 8/005 370/336 |
| 2016/0262084 A1* | 9/2016 | Harada | H04W 8/005 |

OTHER PUBLICATIONS

CATT: "Further discussion on resource allocation for D2D discovery", 3GPP Draft; R1-135089, 3rd Generation Partnership Project (3GPP), Mobile Competence Centre, vol. RAN WG1, Nov. 13, 2013 (Nov. 13, 2013), pp. 1-8, XP050734792, Sophia-Antipolis Cedex; France, Retrieved from the Internet: URL: http://www.3gpp.org/ftp/Meetings_3GPP_SYNC/RAN/RAN1/Docs/ [retrieved on Nov. 13, 2013] p. 1-p. 2 Section 2.4.
HTC: "D2D Discovery Signal and Message Content", 3GPP Draft; R1-135504 D2D Discovery Signal and Message Content, 3rd Generation Partnership Project (3GPP), Mobile Competence Centre vol. RAN WG1 Nov. 13, 2013 (Nov. 13, 2013), XP050735177, Sophia-Antipolis Cedex ; France Retrieved from the Internet: URL: http://www.3gpp.org/ftp/Meetings 3GPP SYNC/RAN/RAN1/Docs/— [retrieved on Nov. 13, 2013] Section 2.3 figure 1.
Huawei, et al., "D2D discovery message size", 3GPP Draft; R1-134075, 3rd Generation Partnership Project (3GPP), Mobile Competence Centre, vol. RAN WG1, Sep. 28, 2013 (Sep. 28, 2013), pp. 1-2, XP050717267, Sophia-Antipolis Cedex; France, Retrieved from the Internet: URL: http://www.3gpp.org/ftp/tsg_ran/WG1_RL1/TSGR1_74b/Docs/ [retrieved on Sep. 28, 2013] table 1.
Intel Corporation: "D2D discovery resource size and mapping to physical resources", 3GPP Draft; R1-135118-Intel-D2D Discovery Resource Size, 3rd Generation Partnership Project (3GPP), Mobile Competence Centre, vol. RAN WG1, Nov. 2, 2013 (Nov. 2, 2013), pp. 1-9, XP050750752, Sophia-Antipolis Cedex; France, Retrieved from the Internet: URL: http://www.3gpp.org/ftp/tsg_ran_WG1_RL1/TSGR1_75/Docs/ [retrieved on Nov. 2, 2013] Section 1, line p. 2 figure 1.
Intel Corporation: "On Resource Allocation and System Operation for D2D Discovery", 3GPP Draft; R1-134141—Intel—Discovery Resource Allocation, 3rd Generation Partnership Project (3GPP), Mobile Competence Centre vol. RAN WG1 Sep. 28, 2013 (Sep. 28, 2013), XP050717331, Sophia-Antipolis Cedex ; France Retrieved from the Internet: URL: http://www.3gpp.org/ftp/tsg_ran/WG11/TSGR1_74b/Docs/—[retrieved on Sep. 28, 2013] Section 1 Section 2 Section 3.3 Section 5.1.
International Search Report and Written Opinion—PCT/US2015/013074—ISA/EPO—dated Jul. 3, 2015.
Partial International Search Report—PCT/US2015/013074—ISA/EPO—dated Apr. 24, 2015.
Samsung: "Resource allocation method for D2D discovery", 3GPP Draft; R1-135224 Resource Allocation Method for D2D Discovery, 3rd Generation Partnership Project (3GPP), Mobile Competence Centre, vol. RAN WG1, Nov. 13, 2013 (Nov. 13, 2013), pp. 1-7, XP050734922, Sophia-Antipolis Cedex; France, Retrieved from the Internet: URL: http://www.3gpp.org/ftp/Meetings_3GPP_SYNC/RAN/RAN1/Docs/ [retrieved on Nov. 13, 2013] p. 2-p. 3 p. 4, line 1-line 2 figure 1.
Chun J., "PAC Proposal for PFD; 15-13-0394-00-0008-pac-proposal-for-pfd", IEEE SA Mentor; 15-13-0394-00-0008-PAC-proposal-for-PFD, vol. 802.15.8, Jul. 8, 2013 (Jul. 8, 2013), pp. 1-17, XP068054920, IEEE—SA Mentor, Piscataway, NJ, USA, [retrieved on Jul. 8, 2013].
European Search Report—EP17152613—Search Authority—The Hague—dated Apr. 13, 2017.
Fujitsu: "On D2D Discovery Signal Design Options", 3GPP Draft; R1-135143_Fujitsu_On D2D Discovery Signal Design Options, 3rd Generation Partnership Project (3GPP), Mobile Competence Centre, vol. RAN WG1, No. San Francisco, United States; Nov. 11, 2013-Nov. 15, 2013, Nov. 13, 2013 (Nov. 13, 2013), pp. 1-5, XP050734845, Sophia-Antipolis Cedex; France, Retrieved from the Internet: URL: http://www.3gpp.org/ftp/Meetings_3GPP_SYNC/RAN/RAN1/Docs/ [retrieved on Nov. 13, 2013].

* cited by examiner

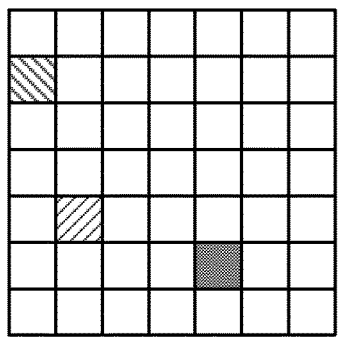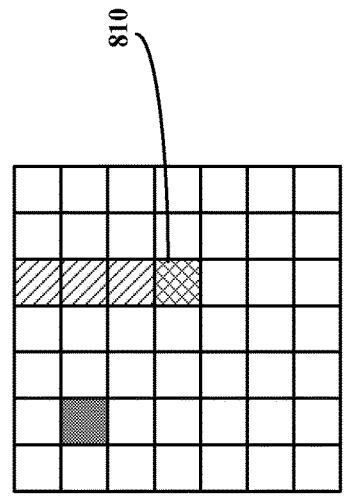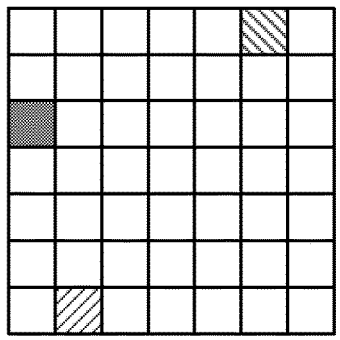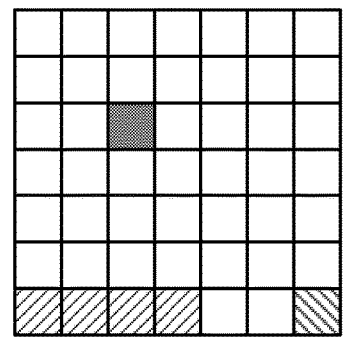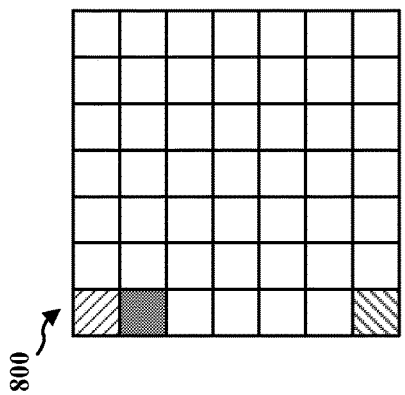
FIG. 8A
FIG. 8B

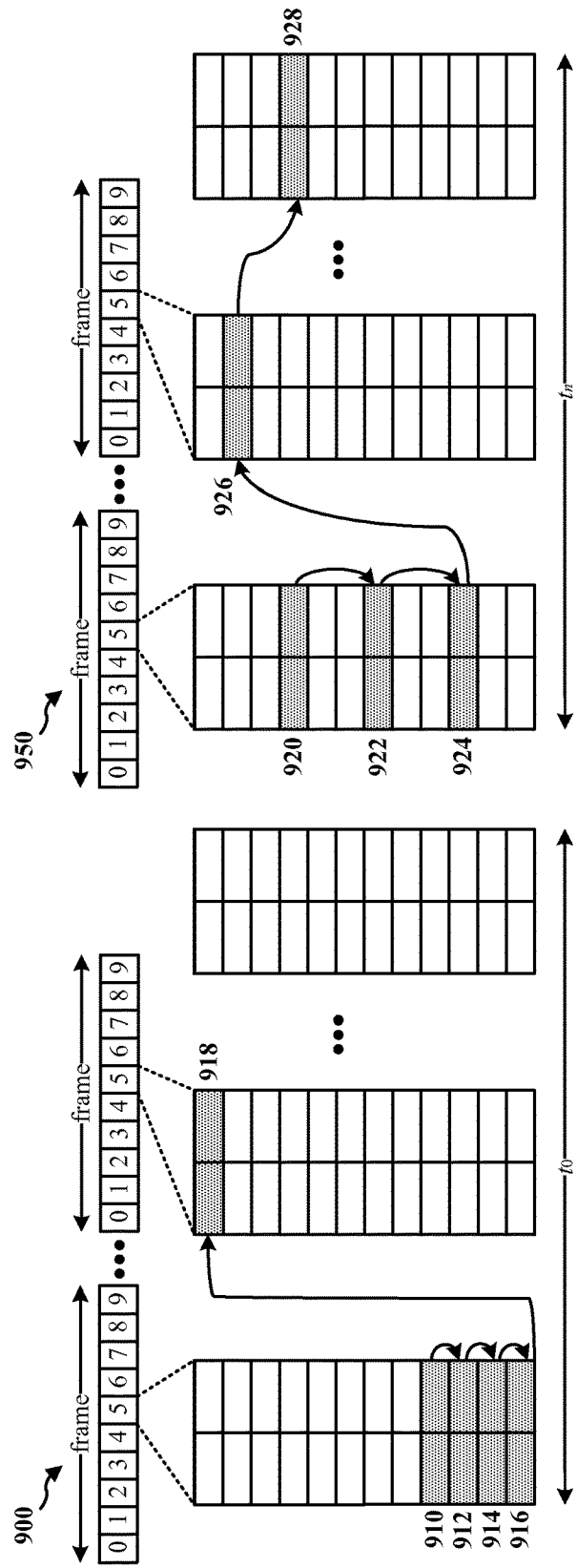

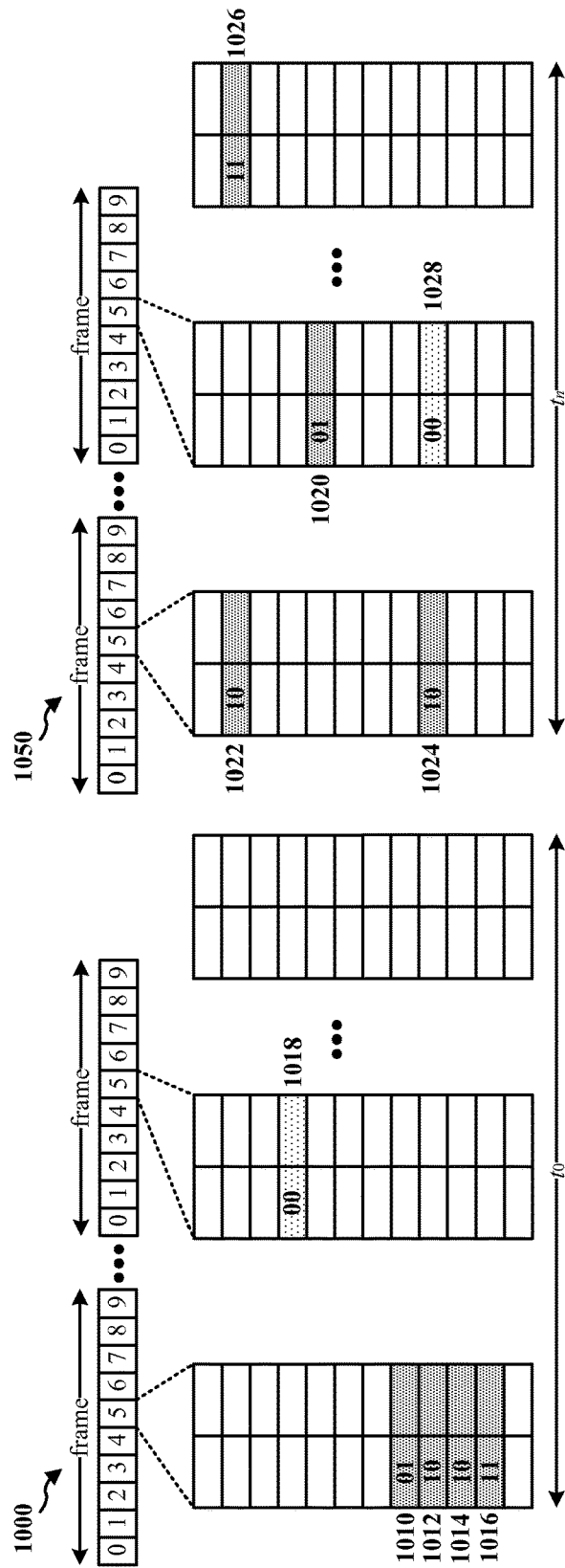

MIXED SIZE EXPRESSION PEER DISCOVERY IN WWAN

BACKGROUND

Field

The present disclosure relates generally to communication systems, and more particularly, to mixed size expression peer discovery in a wireless wide area network (WWAN).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The UE determines a second set of resource block pairs on which to transmit a peer discovery message in a second time cycle based on a mapping of a first set of resource block pairs in a first time cycle to the second set of resource block pairs in the second time cycle. The mapping is a one-to-one mapping between each resource block pair in the first set of resource block pairs to a corresponding resource block pair in the second set of resource block pairs. Resource block pairs in the first set of resource block pairs may be in adjacent allocated resources. In addition, the UE transmits the peer discovery message in the determined second set of resource block pairs.

In an aspect of the disclosure, a method, a computer program product, and an apparatus are provided. The apparatus may be a UE. The UE selects a set of resource block pairs for carrying a peer discovery message. In addition, the UE transmits a peer discovery signal on the set of resource block pairs. The peer discovery signal on a particular resource block pair of the set of resource block pairs includes the peer discovery message and information indicating a location of a next resource block pair.

BRIEF DESCRIPTION OF THE DRAWINGS

FIG. 8A and FIG. 8B are diagrams for illustrating peer discovery resource hopping.

FIG. 9A and FIG. 9B are diagrams for illustrating a first set of exemplary methods.

FIG. 10A and FIG. 10B are additional diagrams for illustrating the first set of exemplary methods.

DETAILED DESCRIPTION

Figure 1:
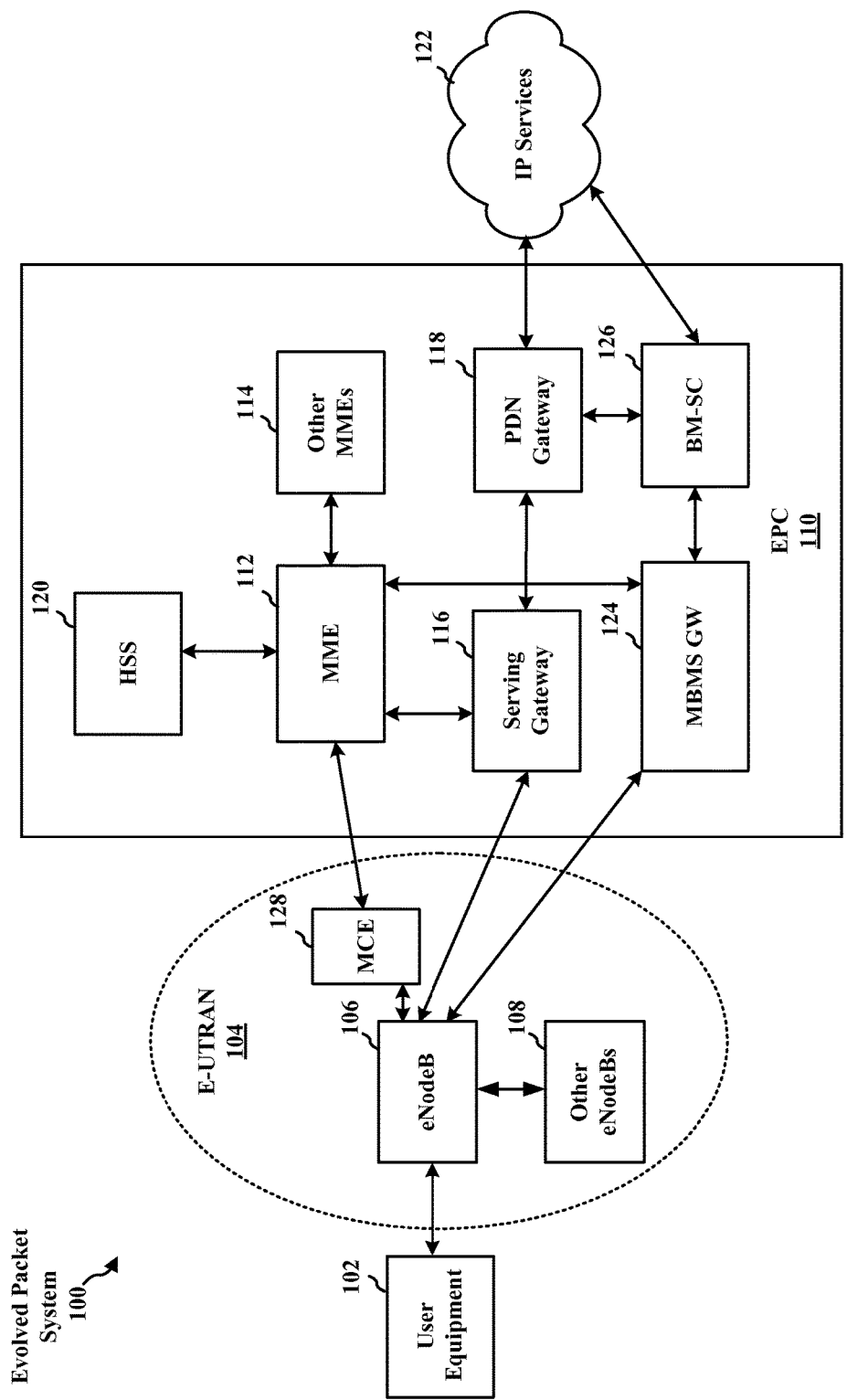
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UEs 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
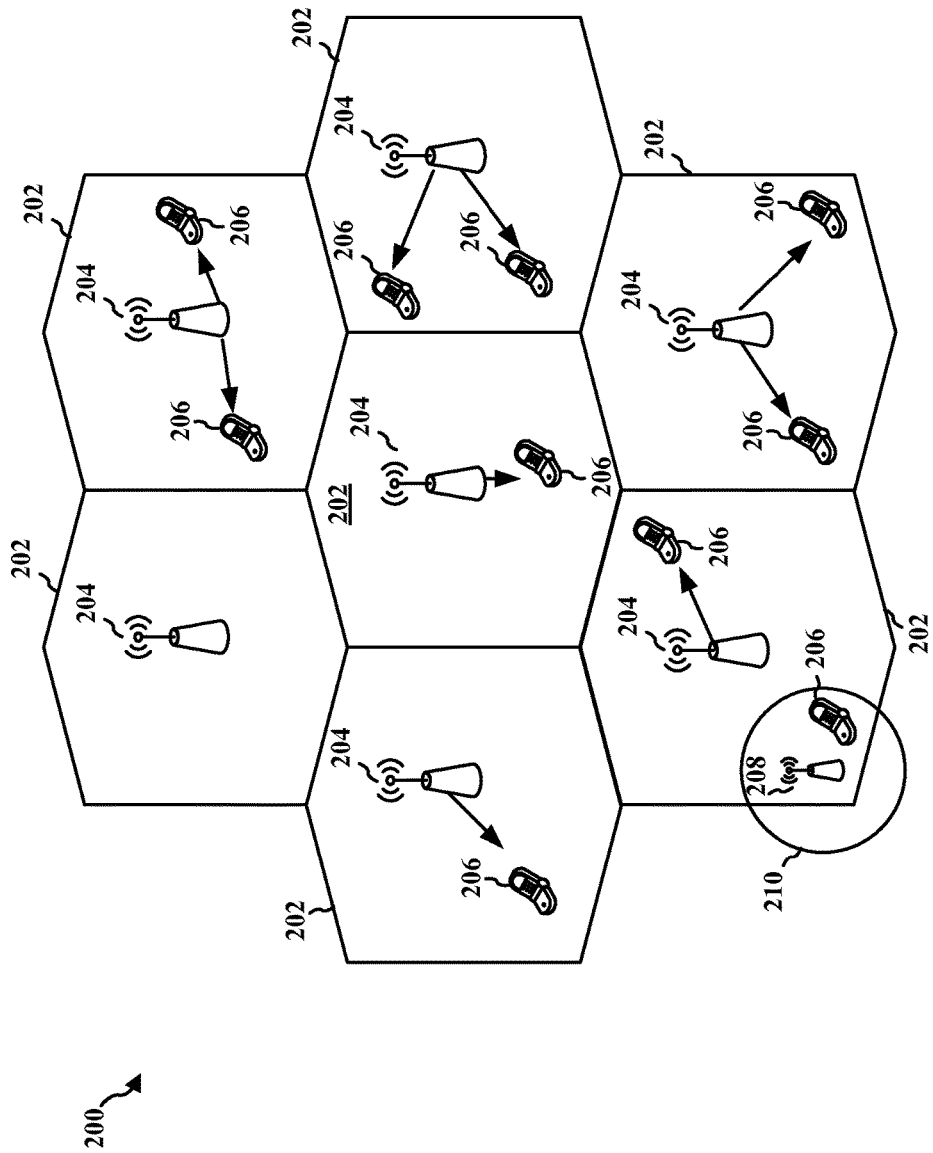
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
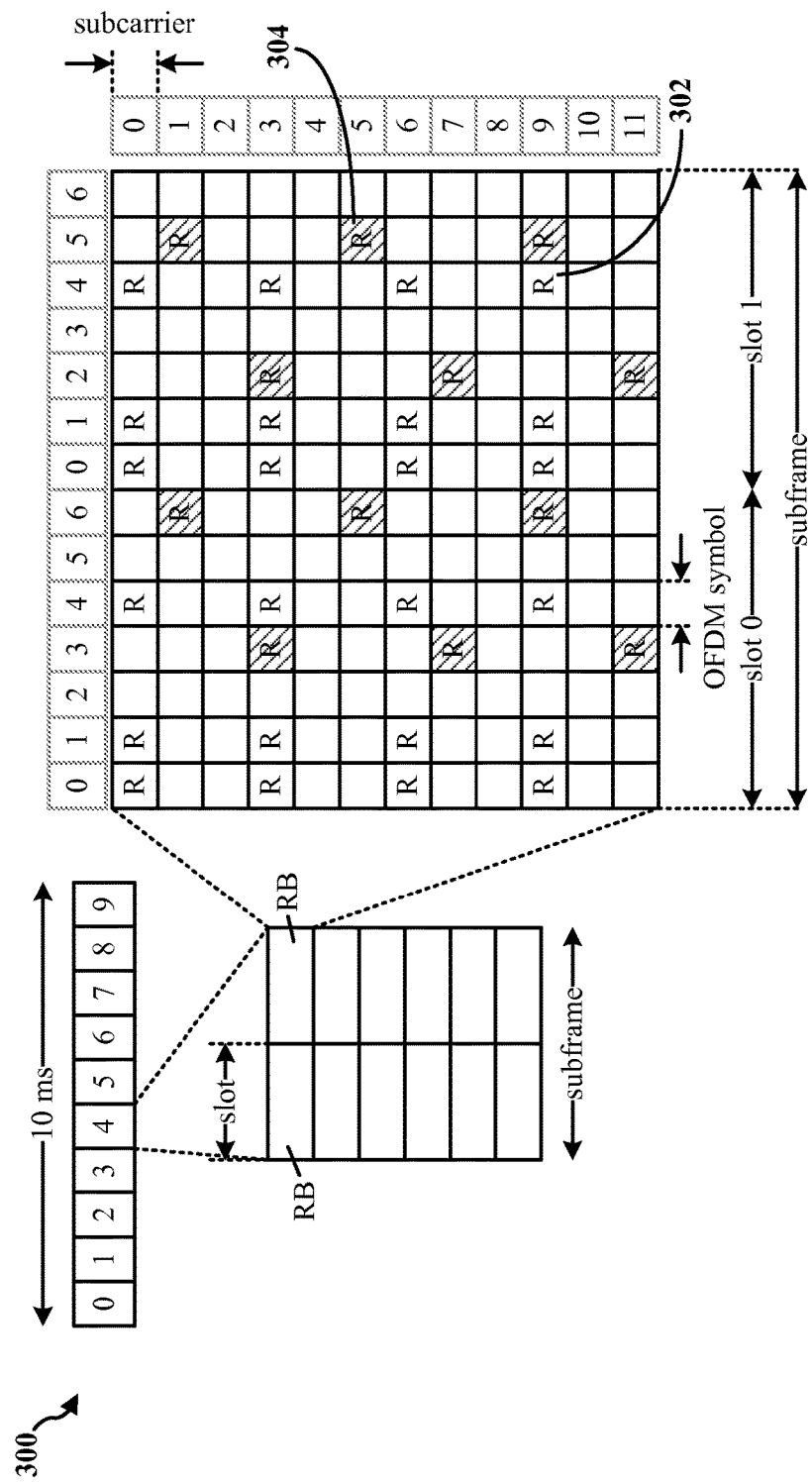
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
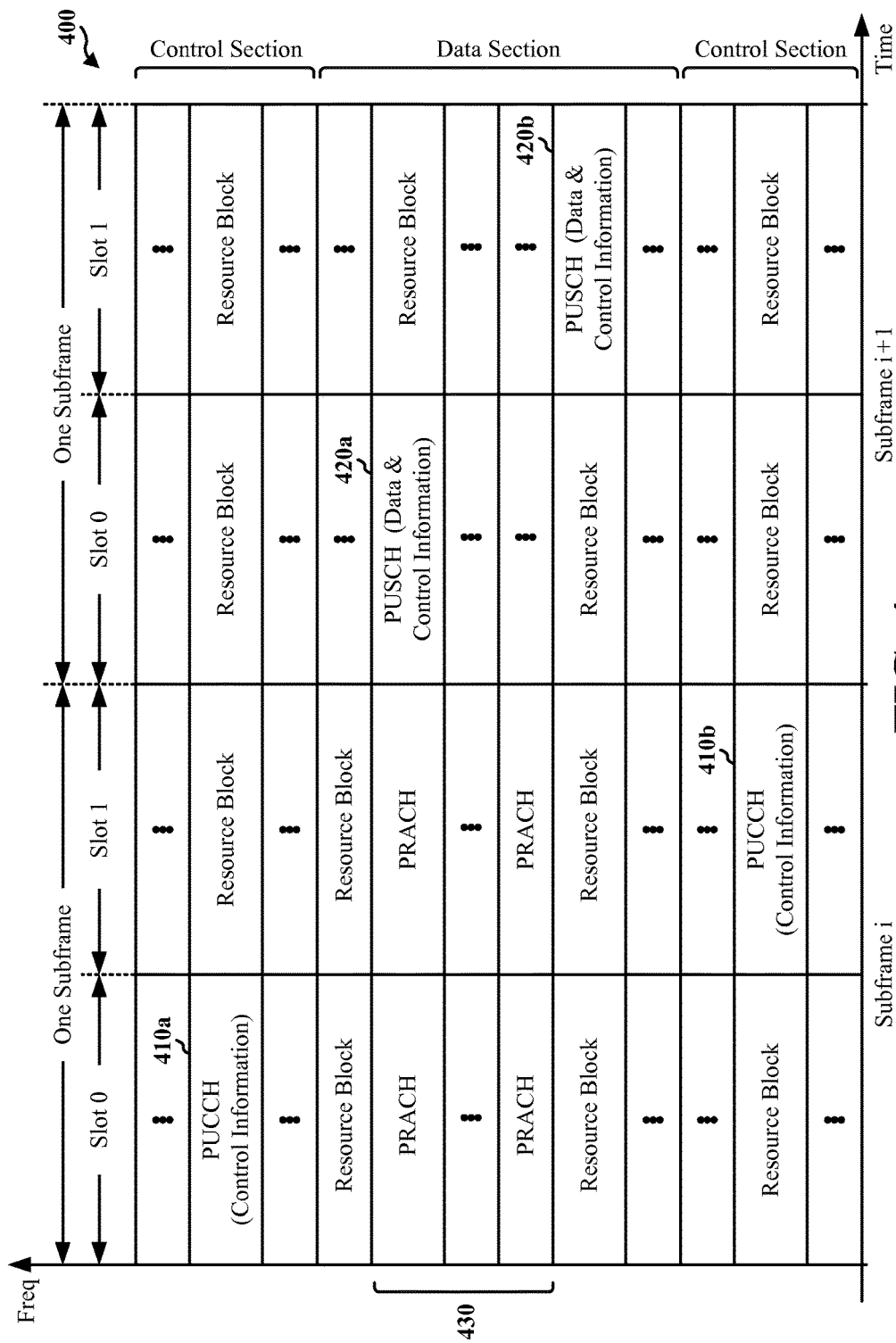
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
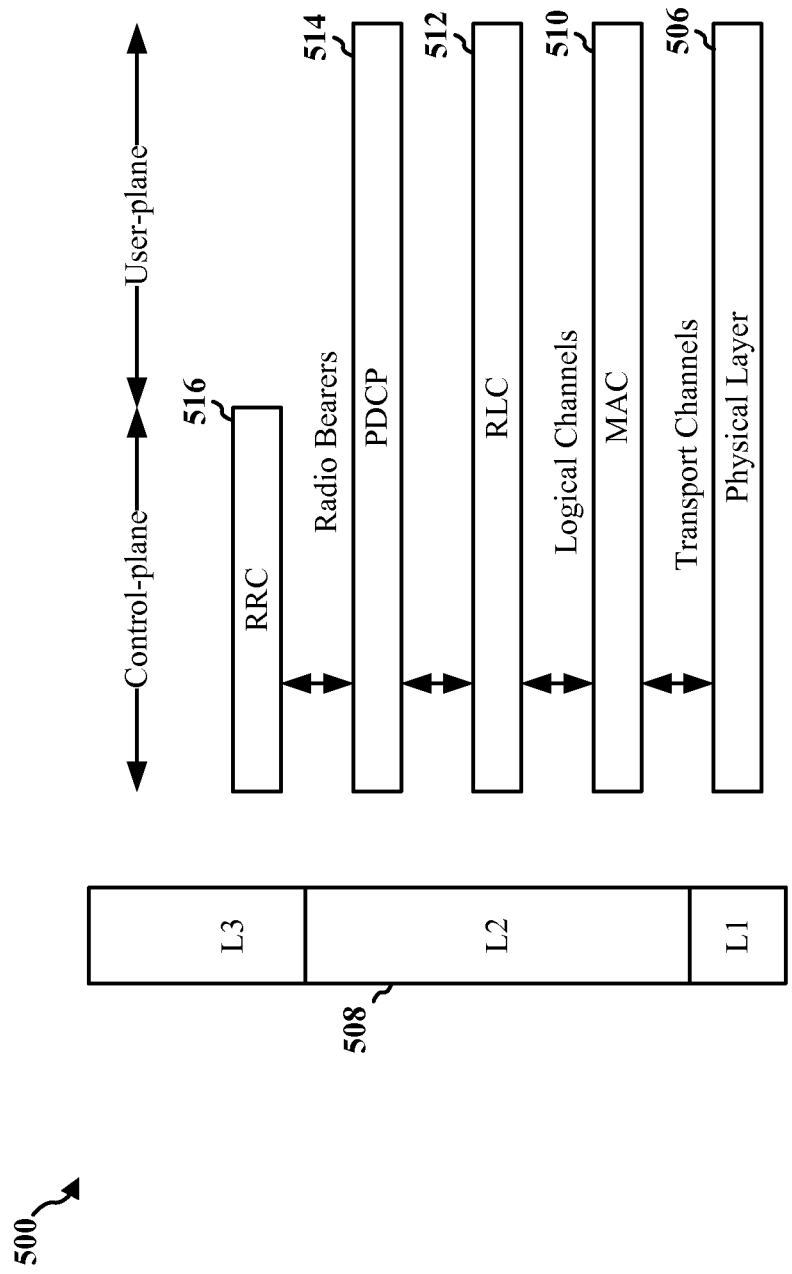
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
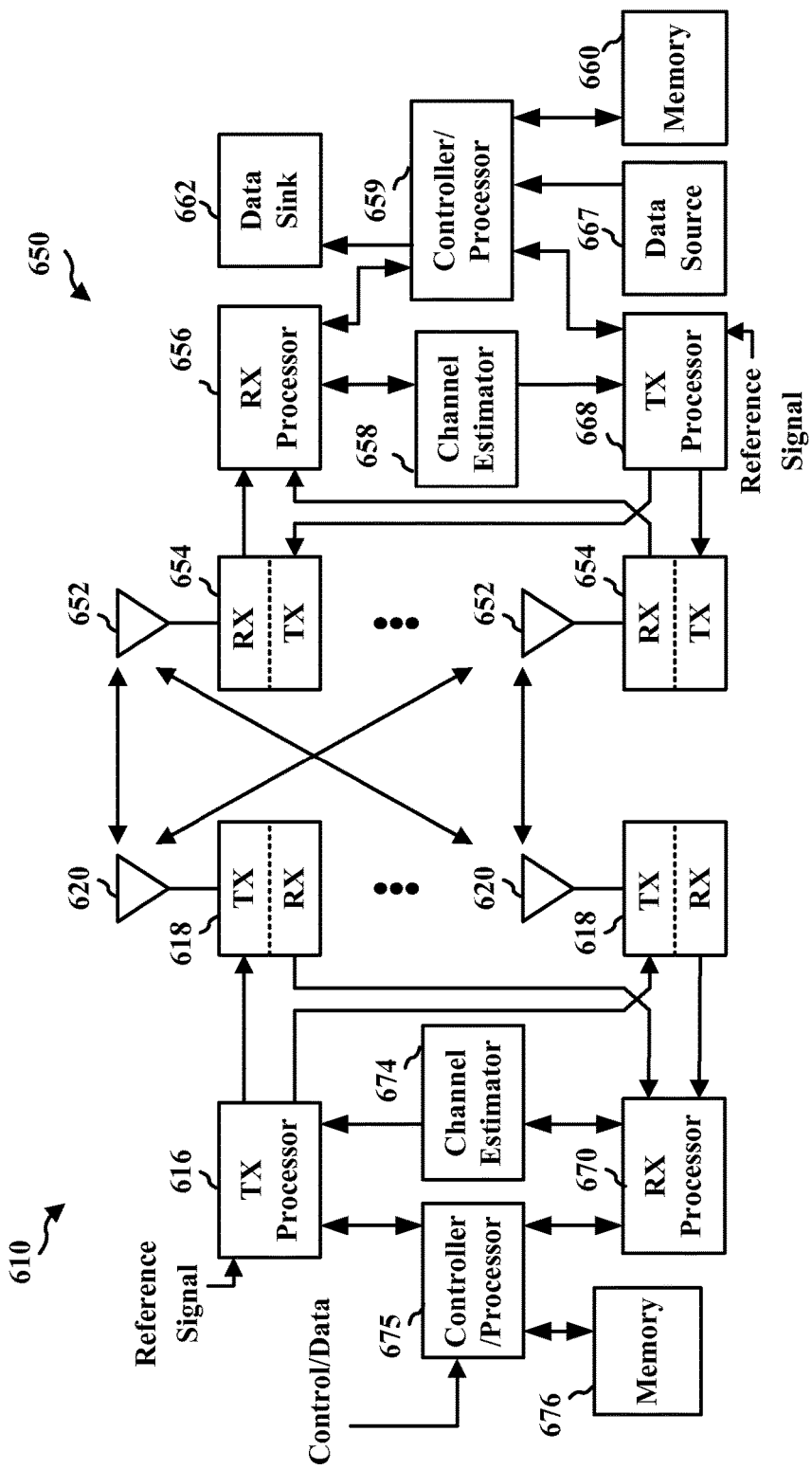
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
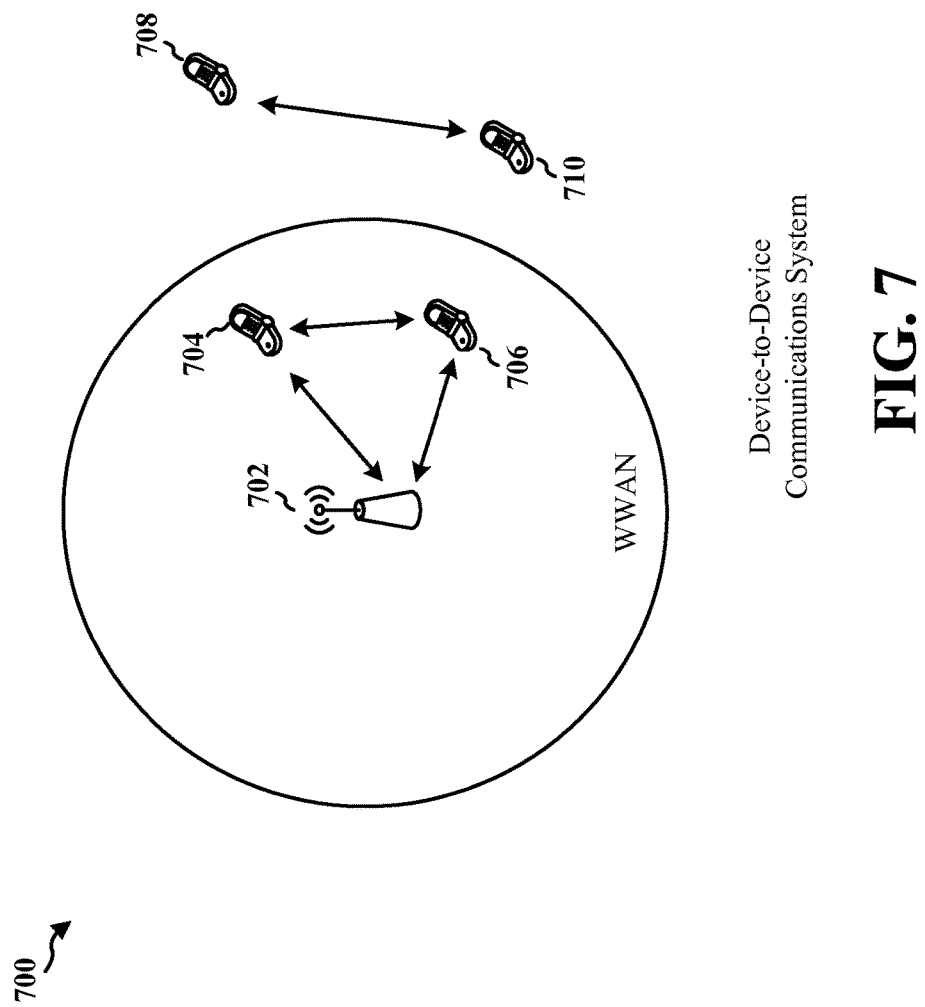
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a WWAN. Some of the wireless devices 704, 706, 708, 710 may communicate together in device-to-device communication (also referred to as "peer-to-peer communication") using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In a WWAN, all communication between UEs is through the uplink/downlink channels between UEs and serving base stations. If two communicating UEs are in the vicinity of each other, direct peer-to-peer communication without going through a base station may enable a new class of traffic and reduce the base station load. To enable such peer-to-peer communication, UEs that are in vicinity of each other should be able to discover each other. One way of enabling such peer discovery is by allowing UEs to transmit peer discovery signals periodically. A UE may detect another UE's presence by listening and decoding the other UE's peer discovery signal.

A UE may discern at least two types of information from a received peer discovery signal. One type of information is the signal strength of the received peer discovery signal. The signal strength is an indication of the proximity of the UE from which the peer discovery signal is received. If the signal strength of a peer discovery signal received from a UE is high, then the UE is likely in close proximity, whereas if the signal strength of a peer discovery signal received from a UE is low, then the UE is not likely in close proximity.

Another type of information is the expression/message transmitted within the peer discovery signal. The expression may indicate what types of applications/services are of interest to the UE transmitting the expression. Because there may be many different application/services that could be conveyed in peer discovery signals, the sizes of the expressions may be different for different UEs. Accordingly, the size of the time/frequency resources on which the peer discovery signal is transmitted may be different for different UEs. The smallest possible size on which a peer discovery signal may be transmitted is two resource blocks (see FIG. 3). Two resource blocks may be referred to as a resource block pair. Peer discovery signals conveying expressions of different sizes may be transmitted on multiple resource block pairs. For example, for a particular UE, a peer discovery signal with an expression may be transmitted on n resource block pairs, where n is greater than or equal to one.

With a half-duplex constraint, a UE transmitting a peer discovery signal in a subframe cannot receive peer discovery signals from other UEs in the same subframe. The half-duplex constraint is overcome by hopping allocated resources so that any pair of UEs is not always transmitting peer discovery signals in the same subframe. Hopping also helps reduce the near far problem by ensuring that two UEs, one of which is close to a receiving UE and another that is far away from the receiving UE, do not always transmit on the same subframe (which may prevent the receiving UE from discovering the far away UE).

FIG. 8A and FIG. 8B are diagrams 800, 850 for illustrating peer discovery resource hopping. As shown in FIG. 8A, when all peer discovery signals are transmitted on the same sized resources, hopping can be designed to hop based on the index of the first block such that the whole contiguous peer discovery resource of a peer discovery signal is hopped without overlap. However, when peer discovery signals are transmitted on different sized resources and hop based on the index of the first block, there is a chance that two peer discovery resources will end up in the same subframe and overlap. For example, as shown in FIG. 8B, peer discovery signals are transmitted by the UEs $UE_1$, $UE_2$, and $UE_3$ on different sized resources. The peer discovery resources utilized by the UEs $UE_1$ and $UE_2$ overlap, as the resource 810 is utilized by both of the UEs $UE_1$ and $UE_2$. Accordingly, methods and apparatuses are needed for hopping peer discovery resources utilized for transmitting peer discovery signals including mixed sized expressions.

FIG. 9A and FIG. 9B are diagrams 900, 950 for illustrating a first set of exemplary methods. In the first set of exemplary methods, discovery resources (sets of resource block pairs) may be linked together to form a linked list. In the example shown in FIGS. 9A, 9B, a UE is allocated five resource block pairs within a set of discovery resources that are allocated to UEs for peer discovery each time cycle. A time cycle may include particular subframes within particular frames of a set of frames. For example, for peer discovery, UEs may be allocated subframe 5 every $m^{th}$ frame within p frames. In the time cycle $t_0$, the allocated five resource block pairs are located in adjacent discovery resources. The adjacent discovery resources are adjacent in the discovery resources that are allocated for peer discovery and may be in different subframes. When the adjacent discovery resources are in different subframes, the adjacent discovery resources include a last discovery resource in a subframe that is allocated for peer discovery and a first discovery resource in a subsequent subframe that is allocated for peer discovery. The discovery resource 910 is linked to the discovery resource 912, the discovery resource 912 is linked to the discovery resource 914, the discovery resource 914 is linked to the discovery resource 916, and the discovery resource 916 is linked to the discovery resource 918 in the next subframe allocated for peer discovery. The discovery resources in a particular time cycle have a predetermined one-to-one mapping between discovery resources in other time cycles. For example, the discovery resource 910 in the time cycle $t_0$ may map to the discovery resource 920 in the time cycle $t_n$, the discovery resource 912 in the time cycle $t_0$ may map to the discovery resource 922 in the time cycle $t_n$, the discovery resource 914 in the time cycle $t_0$ may map to the discovery resource 924 in the time cycle $t_n$, the discovery resource 916 in the time cycle $t_0$ may map to the discovery resource 926 in the time cycle $t_n$, and the discovery resource 918 in the time cycle $t_0$ may map to the discovery resource 928 in the time cycle $t_n$. Accordingly, the discovery resource 920 is linked to the discovery resource 922, the discovery resource 922 is linked to the discovery resource 924, the discovery resource 924 is linked to the discovery resource 926, and the discovery resource 926 is linked to the discovery resource 928. While FIG. 9B shows the discovery resources 920-928 in non-adjacent discovery resources, the discovery resources 920-928 can be in adjacent discovery resources similar to the discovery resources 910-918. In each time cycle $t_i$ for i≠0, the discovery resources that are mapped from the discovery resources 910-918 may hop around to different sets of discovery resources, some of which may be in adjacent resources and some of which may be in non-adjacent discovery resources.

A UE that desires to transmit a peer discovery signal on five discovery resources in time cycle $t_n$ may determine a received power on each of the discovery resources in the time cycle $t_{n-1}$. The UE may select a set of discovery resources in time cycle $t_n$ based on the determined received power. For example, the UE may select a set of discovery resources that have a received power less than a threshold. In another example, the UE may select a set of discovery resources that have the lowest sum received power. In another example, the UE may select a set of discovery resources randomly from discovery resources that have a sum received power less than the threshold.

An eNB may determine whether to link peer discovery resources dynamically or statically. For dynamic linking, a UE may send its serving eNB the discovery resources that the UE would like to use. The eNB may determine whether to link the discovery resources based on one or more factors. For example, an eNB may determine whether to link the discovery resources based on whether the discovery resources are currently being utilized by other nearby UEs. For another example, an eNB may determine whether to link discovery resources based on fees paid by a user of the UE, assuming users must pay for the use of particular discovery resources. Upon making the determination, the eNB may inform the UE whether the UE may use the particular discovery resources. The eNB may broadcast the dynamic linking to all the UEs. For static linking, the UE may select a previously linked set of discovery resources in time cycle $t_n$ based on the determined received power.

As discussed supra, a set of discovery resources in time cycle $t_n$ may be determined from a set of adjacent discovery resources in time cycle $t_0$. Assume the UE determines to transmit on the discovery resources 920-928. The UE determines the set of resource block pairs 920-928 on which to transmit a peer discovery message in the time cycle $t_n$ based on the one-to-one mapping of the set of resource block pairs 910-918 in the time cycle $t_0$ to the set of resource block pairs 920-928 in the time cycle $t_n$. The resource block pairs in the set of resource block pairs 910-918 may be in adjacent allocated resources. Subsequently, the UE transmits the peer discovery message in the determined set of resource block pairs 920-928.

FIG. 10A and FIG. 10B are additional diagrams 1000, 1050 for illustrating the first set of exemplary methods. A UE may indicate that the UE is using particular resource block pairs by inserting a message within the peer discovery message or within pilot sequences transmitted in the same resource block pairs that carry the peer discovery message. In particular, a UE may generate a message based on an order of a particular resource block pair within a set of resource block pairs, and may transmit information indicating the message with the peer discovery message. In one configuration, a UE may select a pilot sequence from a plurality of pilot sequences based on the message. In such a configuration, the information indicating the message is the selected pilot sequence and the selected pilot sequence is transmitted in reference signals within the particular resource block pair carrying the peer discovery message. In another configuration, a UE may transmit the message in the particular resource block pair within the peer discovery message.

In one example, a UE may indicate that a resource block pair is by itself (only one resource block pair is transmitted) by indicating a "00" within the resource block pair carrying the peer discovery message. A UE may indicate that a resource block pair is at the beginning of the set of resource block pairs by indicating a "01" within the resource block pair. A UE may indicate that a resource block pair is in the middle of the set of resource block pairs by indicating a "10" within the resource block pair. A UE may indicate that a resource block pair is at the end of the set of resource block pairs by indicating a "11" within the resource block pair.

Referring to FIG. 10A, a first UE may transmit a peer discovery message in the time cycle $t_0$ within the resource block pairs 1010, 1012, 1014, 1016. The first UE may transmit a message "01" within the resource block pair 1010 to indicate that the resource block pair 1010 is at the beginning of the set of resource block pairs 1010-1016. The first UE may transmit a message "10" within the resource block pairs 1012, 1014 to indicate that the resource block pairs 1012, 1014 are in the middle of the set of resource block pairs 1010-1016. The first UE may transmit a message "11" within the resource block pair 1016 to indicate that the resource block pair 1016 is at the end of the set of resource block pairs 1010-1016. A second UE may transmit a message "00" within the resource block pair 1018 to indicate that the resource block pair 1018 is the only resource block pair in the set of resource block pairs 1018.

Referring to FIG. 10B, the first UE may transmit a peer discovery message in the time cycle $t_n$ within the resource block pairs 1020, 1022, 1024, 1026. The resource block pairs 1020, 1022, 1024, 1026 have a one-to-one mapping from the resource block pairs 1010, 1012, 1014, 1016, respectively. The first UE may transmit a message "01" within the resource block pair 1020 to indicate that the resource block pair 1020 is at the beginning of the set of resource block pairs 1020-1026. The first UE may transmit a message "10" within the resource block pairs 1022, 1024 to indicate that the resource block pairs 1022, 1024 are in the middle of the set of resource block pairs 1020-1026. The first UE may transmit a message "11" within the resource block pair 1026 to indicate that the resource block pair 1026 is at the end of the set of resource block pairs 1020-1026. The second UE may transmit a peer discovery message in the time cycle $t_n$ within the resource block pair 1028. The resource block pair 1028 has a one-to-one mapping from the resource block pair 1018. The second UE may transmit a message "00" within the resource block pair 1028 to indicate that the resource block pair 1028 is the only resource block pair in the set of resource block pairs 1028.

The message indicating the order of the particular resource block pair within a set of resource block pairs enables a receiving UE to determine which resource block pairs belong to the same PD signal. For example, a UE may receive peer discovery messages in resource block pairs including the resource block pairs 1020-1026. Based on the message "01" in the resource block pair 1020, the UE determines that the resource block pair 1020 is the first resource block pair of a set of resource block pairs. Based on the one-to-one mapping, the UE may map the resource block pair 1020 in the time cycle $t_n$ to the resource block pair 1010 in the time cycle $t_0$. For static linking, when resource block pairs used for transmitting a peer discovery message are in adjacent resource block pairs in the time cycle $t_0$, the UE may determine that the resource block pair 1012 follows the resource block pair 1010, and therefore (based on the one-to-one mapping) that the resource block pair 1022 follows the resource block pair 1020. Based on the message "10" in the resource block pair 1022, the UE determines that the resource block pair 1022 is in the middle of the set of resource block pairs. The UE may determine that the resource block pair 1014 follows the resource block pair 1012, and therefore that the resource block pair 1024 follows the resource block pair 1022. Based on the message "10" in the resource block pair 1024, the UE determines that the resource block pair 1024 is in the middle of the set of resource block pairs. The UE may determine that the resource block pair 1016 follows the resource block pair 1014, and therefore that the resource block pair 1026 follows the resource block pair 1024. Based on the message "11" in the resource block pair 1026, the UE determines that the resource block pair 1026 is the last resource block pair of the set of resource block pairs. The UE also determines that the set of resource block pairs includes the resource block pairs 1020-1026.

Figure 11:
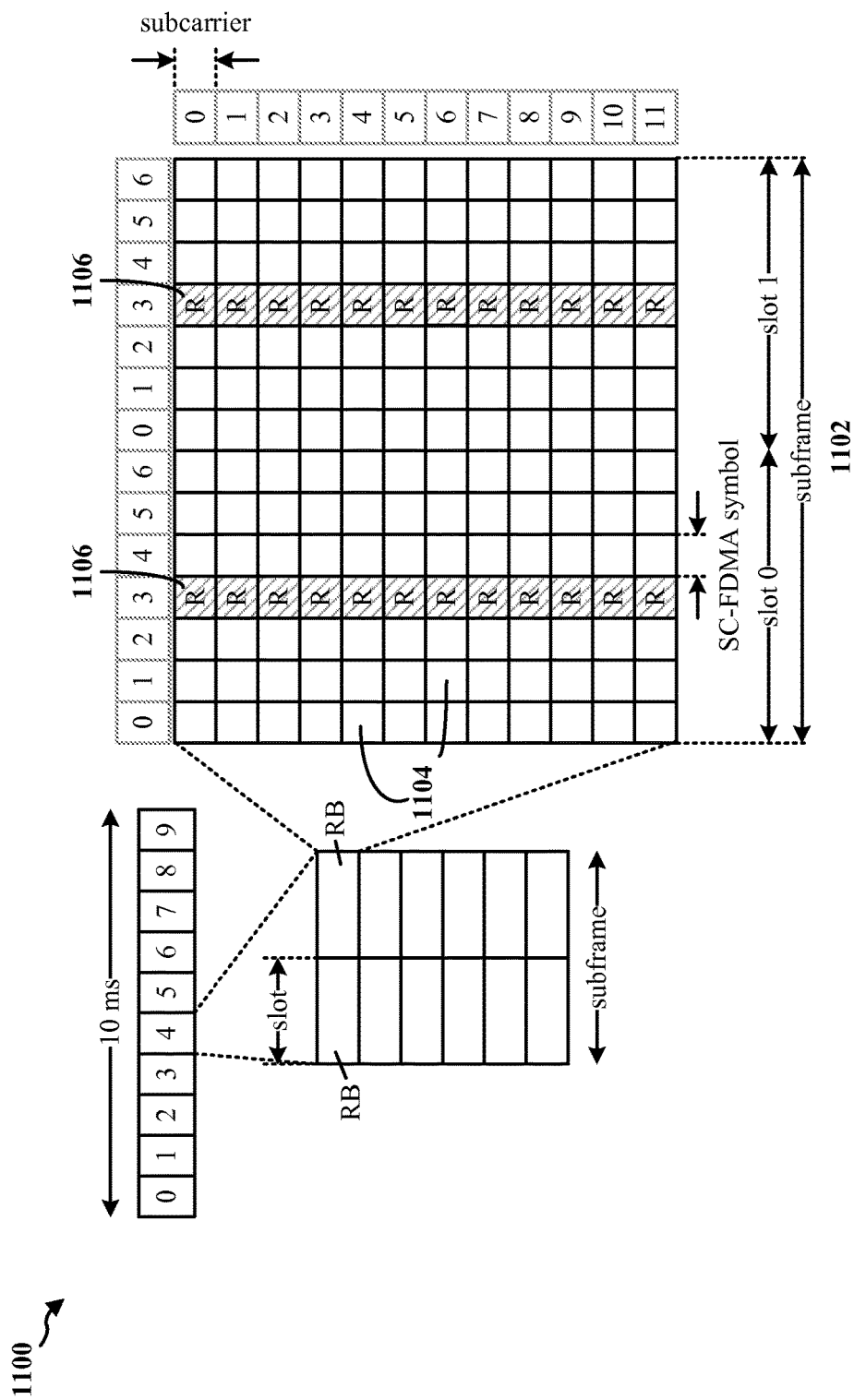
FIG. 11 is another diagram for illustrating the first set of exemplary methods.

FIG. 11 is another diagram 1100 for illustrating the first set of exemplary methods. FIG. 11 illustrates an example of an UL frame structure in LTE. An UL frame (10 ms) may be divided into 10 equally sized subframes 1102. Each subframe may include two consecutive time slots. A resource grid may be used to represent two time slots, each time slot including a resource block. The resource grid is divided into multiple resource elements. A resource block may contain 12 consecutive subcarriers in the frequency domain and 7 consecutive SC-FDMA symbols in the time domain, or 84 resource elements. The resource elements 1104 may include data and/or control information. The resource elements 1106 may include reference/pilot signals.

When a UE generates a message that indicates an order of a particular resource block pair, the UE may select a pilot sequence from a plurality of pilot sequences based on the message. The UE may transmit the selected pilot sequence in reference signals (indicated as "R") within the resource elements 1106. Alternatively, the UE may generate a message that indicates an order of a particular resource block pair and transmit the message with the peer discovery message within the resource elements 1104. The resource elements 1104 include all of the resource elements without the "R" indication.

Figures 12A, 12B:
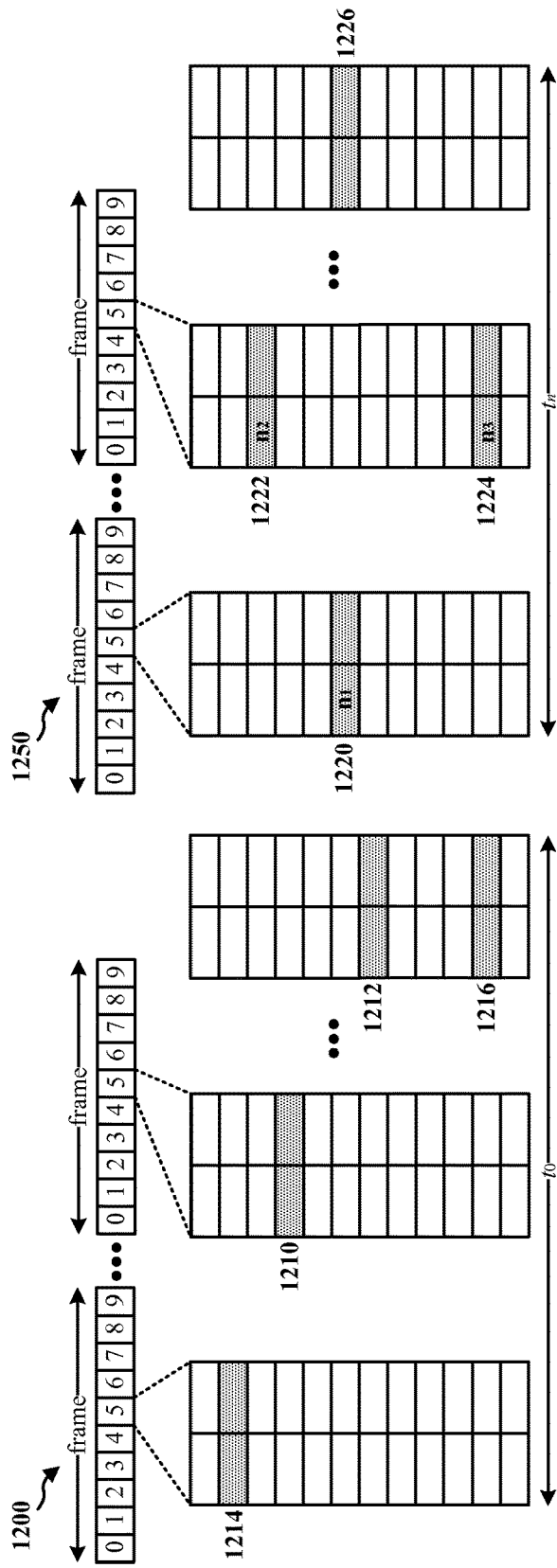
FIG. 12A and FIG. 12B are diagrams for illustrating a second set of exemplary methods.

FIG. 12A and FIG. 12B are diagrams 1200 and 1250, respectively, for illustrating a second set of exemplary methods. In the second set of exemplary methods, a UE may select available resource block pairs that are desirable (e.g., discovery resources have received power less than a threshold, have a lowest sum received power, or are selected randomly from discovery resources that have a sum received power less than the threshold). The UE may break the peer discovery message into parts according to the number of resource block pairs that the UE uses. The UE may add an additional field indicating the absolute location or relative offset of the next resource block pair. The absolute location or the relative offset may be with respect to the current time cycle $t_n$ or may be with respect to the first time cycle $t_0$. The UE then separately encodes the separate parts of the peer discovery message with the additional field and modulates each of the encoded messages to the selected resource block pairs.

Referring to FIGS. 12A, 12B, assume a UE selects a set of resource block pairs 1220, 1222, 1224, 1226 for transmitting a peer discovery message. The UE may determine to include information indicating a location of a next resource block pair with the peer discovery message. Accordingly, the UE may include information $n_1$ with the peer discovery message in the resource block pair 1220, information $n_2$ with the peer discovery message in the resource block pair 1222, and information $n_3$ with the peer discovery message in the resource block pair 1224. In one configuration, the information $n_1$, $n_2$, $n_3$ is information indicating a location (absolute location or relative offset) of a next resource block pair of the resource block pairs 1222, 1224, 1226, respectively. For example, the information $n_1$ in the resource block pair 1220 may indicate the location of the resource block pair 1222, the information $n_2$ in the resource block pair 1222 may indicate the location of the resource block pair 1224, and the information $n_3$ in the resource block pair 1224 may indicate the location of the resource block pair 1226. The information $n_1$ indicating the location of the resource block pair 1222 may be an absolute location of the resource block pair 1222 or a relative offset with respect to the resource block pair 1220. The information $n_2$ indicating the location of the resource block pair 1224 may be an absolute location of the resource block pair 1224 or a relative offset with respect to the resource block pair 1222. The information $n_3$ indicating the location of the resource block pair 1226 may be an absolute location of the resource block pair 1226 or a relative offset with respect to the resource block pair 1224.

In another configuration, the information $n_1$, $n_2$, $n_3$ is information indicating a location (absolute location or relative offset) of a next resource block pair of the resource block pairs 1212, 1214, 1216. For example, the information $n_1$ in the resource block pair 1220 may indicate the location of the resource block pair 1212, the information $n_2$ in the resource block pair 1222 may indicate the location of the resource block pair 1214, and the information $n_3$ in the resource block pair 1224 may indicate the location of the resource block pair 1216. The information $n_1$ indicating the location of the resource block pair 1212 may be an absolute location of the resource block pair 1212 or a relative offset with respect to the resource block pair 1210. The information $n_2$ indicating the location of the resource block pair 1214 may be an absolute location of the resource block pair 1214 or a relative offset with respect to the resource block pair 1212. The information $n_3$ indicating the location of the resource block pair 1216 may be an absolute location of the resource block pair 1216 or a relative offset with respect to the resource block pair 1214. If the information $n_1$, $n_2$, $n_3$ is an absolute location, based on the locations of the resource block pairs 1212, 1214, 1216 and a predetermined one-toone mapping from the resource block pairs 1212, 1214, 1216 to the resource block pairs 1222, 1224, 1226, respectively, the UE may determine the locations of the resource block pairs 1222, 1224, 1226. If the information $n_1$, $n_2$, $n_3$ is a relative offset, based on the locations of the resource block pairs 1210, 1212, 1214, 1216 and a predetermined one-to-one mapping from the resource block pairs 1212, 1214, 1216 to the resource block pairs 1222, 1224, 1226, respectively, the UE may determine the locations of the resource block pairs 1222, 1224, 1226. Subsequently, the UE transmits the peer discovery signal on the set of resource block pairs 1220, 1222, 1224, 1226.

Figure 13:
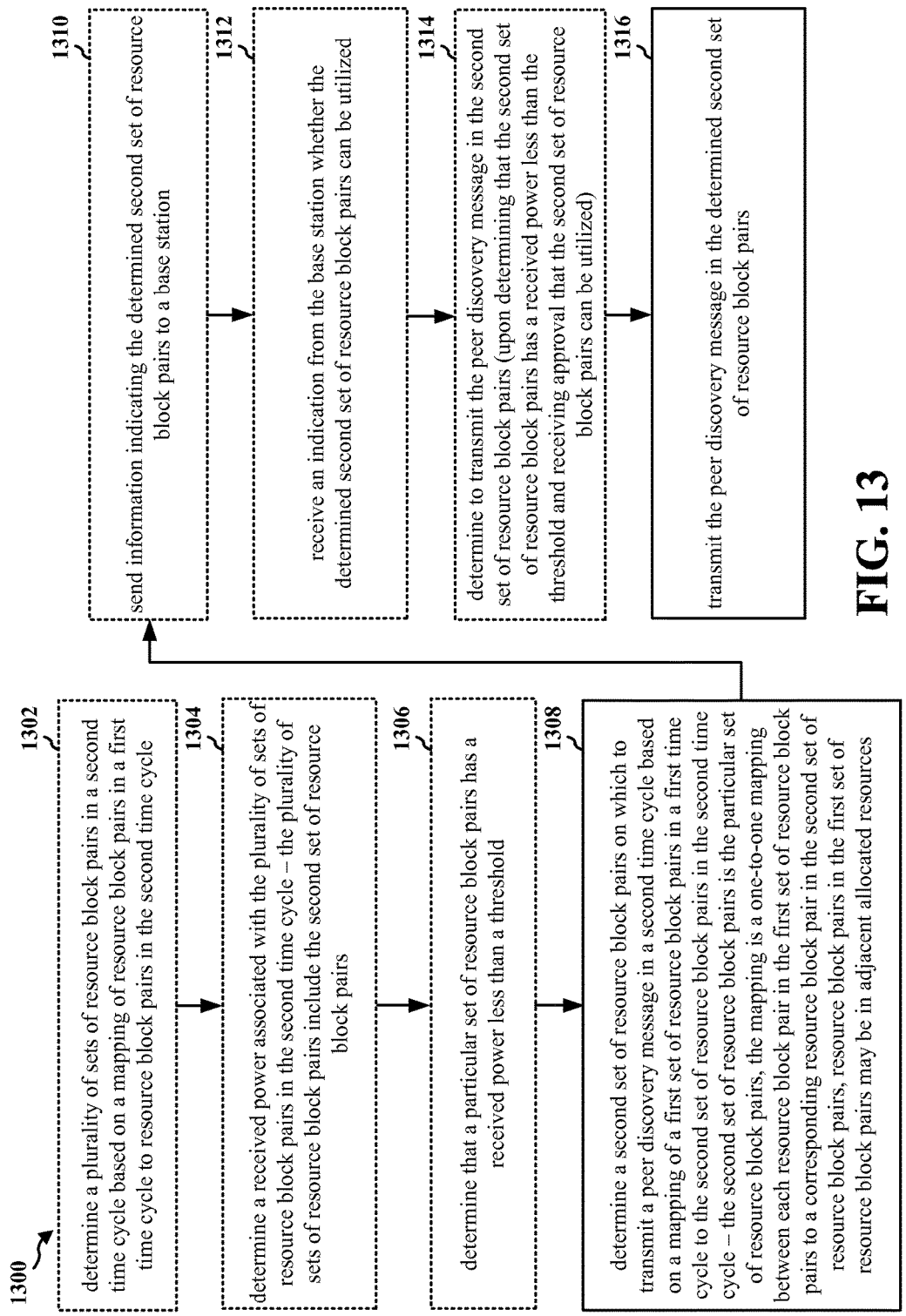
FIG. 13 is a first flow chart for the first set of exemplary methods.

FIG. 13 is a first flow chart 1300 for the first set of exemplary methods. The method may be performed by a UE. As shown in FIG. 13, in step 1308, the UE determines a second set of resource block pairs on which to transmit a peer discovery message in a second time cycle based on a mapping of a first set of resource block pairs in a first time cycle to the second set of resource block pairs in the second time cycle. The mapping is a one-to-one mapping between each resource block pair in the first set of resource block pairs to a corresponding resource block pair in the second set of resource block pairs. Resource block pairs in the first set of resource block pairs may be in adjacent allocated resources. For example, referring to FIGS. 9A, 9B, a UE determines a second set of resource block pairs 920-928 on which to transmit a peer discovery message in a second time cycle $t_n$ based on a mapping of a first set of resource block pairs 910-918 in a first time cycle $t_0$ to the second set of resource block pairs 920-928 in the second time cycle $t_n$. The mapping is a one-to-one mapping between each resource block pair in the first set of resource block pairs 910-918 to a corresponding resource block pair in the second set of resource block pairs 920-928. Resource block pairs in the first set of resource block pairs 910-918 are in adjacent allocated resources.

In step 1316, the UE transmits the peer discovery message in the determined second set of resource block pairs. The resource block pairs in the second set of resource block pairs may be in non-adjacent allocated resources. For example, referring to FIG. 9B, a UE may transmit a peer discovery message in the determined second set of resource block pairs 920-928. As shown in FIG. 9B, the resource block pairs in the second set of resource block pairs 920-928 may be in non-adjacent allocated resources.

After step 1308, in step 1310, the UE may send information indicating the determined second set of resource block pairs to a base station. In addition, in step 1312, the UE may receive an indication from the base station whether the determined second set of resource block pairs can be utilized. Before step 1308, in step 1302, the UE may determine a plurality of sets of resource block pairs in the second time cycle based on a mapping of resource block pairs (which may be adjacent) in the first time cycle to resource block pairs in the second time cycle. In step 1304, the UE may determine a received power associated with the plurality of sets of resource block pairs in the second time cycle. The plurality of sets of resource block pairs may include the second set of resource block pairs. In step 1306, the UE may determine that the second set of resource block pairs has a received power less than a threshold. After step 1312 and before step 1316, in step 1314, the UE may determine to transmit the peer discovery message in the second set of resource block pairs upon determining that the second set of resource block pairs has a received power less than the threshold. The second set of resource block pairs may have a lowest received power of the plurality of sets of resource block pairs.

For example, referring to FIGS. 9A, 9B, a UE may determine a plurality of sets of resource block pairs (one of the plurality of sets of resource block pairs includes the set of resource block pairs 920-928) in the second time cycle $t_n$ based on a mapping of resource block pairs in the first time cycle $t_0$ to resource block pairs in the second time cycle $t_n$. For static linking, when each set of resource block pairs of the plurality of sets of resource block pairs in the second time cycle $t_n$ has a mapping in adjacent resource block pairs in the first time cycle $t_0$, a UE may determine the plurality of sets of resource block pairs by mapping adjacent resources from the first time cycle $t_0$ to the second time cycle $t_n$. The UE may determine a received power associated with the plurality of sets of resource block pairs in the second time cycle $t_n$. Accordingly, as one of the plurality of sets of resource block pairs in the second time cycle $t_n$ includes the set of resource block pairs 920-928, the UE determines the received power within the resource block pairs 920-928. Assume the UE determines that the second set of resource block pairs has a received power less than a threshold. The UE may then determine to transmit the peer discovery message in the second set of resource block pairs 920-928 upon determining that the second set of resource block pairs 920-928 has a received power less than the threshold (the resource block pairs 920-928 have received power less than a threshold, have a lowest sum received power, or are selected randomly from the plurality of sets of resource block pairs that have a sum received power less than the threshold).

Figure 14:
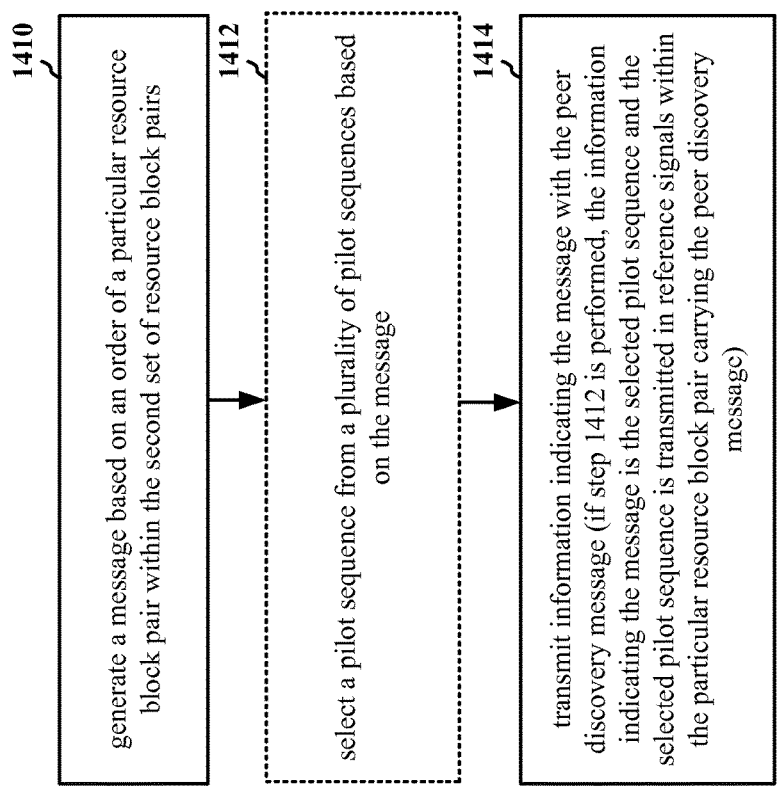
FIG. 14 is a second flow chart for the first set of exemplary methods.

FIG. 14 is a second flow chart 1400 for the first set of exemplary methods. The method may be performed by a UE. As shown in FIG. 14, in step 1410, the UE generates a message based on an order of a particular resource block pair within the second set of resource block pairs. In addition, in step 1414, the UE transmits information indicating the message with the peer discovery message. After step 1410 and before step 1414, in step 1412, the UE may select a pilot sequence from a plurality of pilot sequences based on the message. The information indicating the message may be the selected pilot sequence and the selected pilot sequence may be transmitted in reference signals within the particular resource block pair carrying the peer discovery message. Alternatively, the message may be transmitted in the particular resource block pair within the peer discovery message.

For example, referring to FIG. 10B, a UE may generate a message (e.g., "00", "01", "10" or "11) based on an order of a particular resource block pair within the second set of resource block pairs. The UE transmits information indicating the message with the peer discovery message. Referring to FIG. 11, the UE may select a pilot sequence from a plurality of pilot sequences based on the message. The information indicating the message may be the selected pilot sequence and the selected pilot sequence may be transmitted in reference signals (see resource elements 1106) within the particular resource block pair carrying the peer discovery message. Alternatively, the message may be transmitted in the particular resource block pair within the peer discovery message (within the resource elements 1104).

Figure 15:
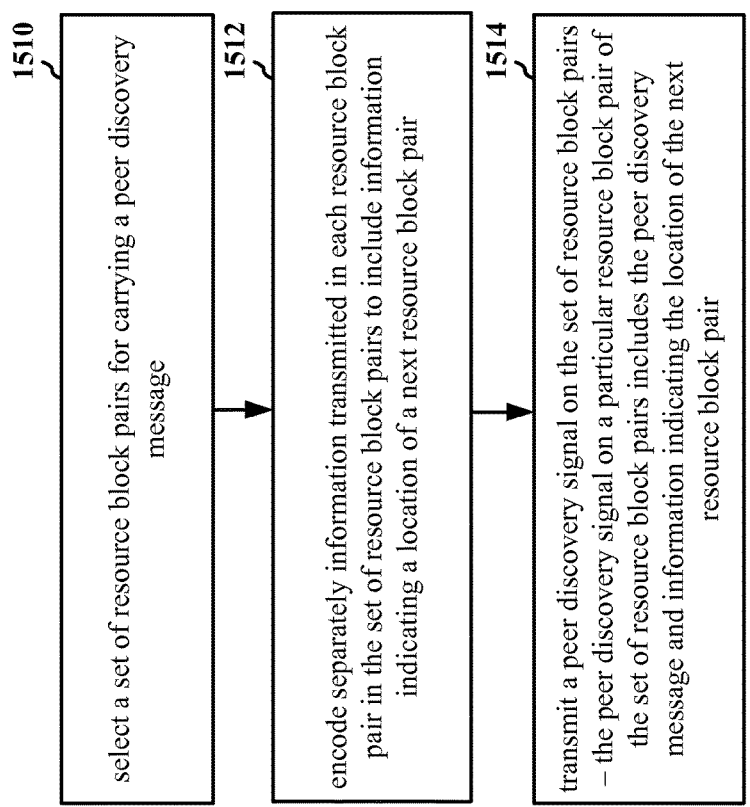
FIG. 15 is a flow chart for the second set of exemplary methods.

FIG. 15 is a flow chart 1500 for the second set of exemplary methods. The method may be performed by a UE. As shown in FIG. 15, in step 1510, the UE selects a set of resource block pairs for carrying a peer discovery message. In step 1512, the UE may encode separately information transmitted in each resource block pair in the set of resource block pairs to include the information indicating a location of a next resource block pair. In step 1514, the UE transmits a peer discovery signal on the set of resource block pairs. The peer discovery signal on a particular resource block pair of the set of resource block pairs includes the peer discovery message and information indicating the location of the next resource block pair. The information indicating the location of the next resource block pair may be a next resource block pair of the set of resource block pairs. The information indicating the location of the next resource block pair may be a next resource block pair of a second set of resource block pairs. The second set of resource block pairs may be in a first time cycle and the set of resource block pairs may be in a second time cycle. The location indicating the next resource block pair may be an absolute location within the plurality of resource block pairs or a relative offset with respect to the particular resource block pair.

For example, referring to FIGS. 12A, 12B, a UE may select a set of resource block pairs 1220-1226 for carrying a peer discovery message. The UE may encode separately information (e.g., $n_1$, $n_2$, $n_3$) transmitted in each resource block pair in the set of resource block pairs 1220-1226 to include the information indicating a location of a next resource block pair. The UE may encode information indicating the location of the next resource block pair within the resource block pairs 1220-1224, but not within the resource block pair 1226, as the resource block pair 1226 is the last resource block pair carrying the peer discovery message. The UE may transmit a peer discovery signal on the set of resource block pairs 1220-1226. The peer discovery signal on a particular resource block pair of the set of resource block pairs 1220-1226 includes the peer discovery message and information (e.g., $n_1$, $n_2$, $n_3$) indicating the location of the next resource block pair. For the resource block pair 1226, as no additional information is encoded in the resource block pair, the fact that there is no additional information encoded may itself be information indicating that there is no next resource block pair. The information indicating the location of the next resource block pair may be a next resource block pair of the set of resource block pairs 1220-1226. The information indicating the location of the next resource block pair may be a next resource block pair of a second set of resource block pairs 1210-1216. The second set of resource block pairs 1210-1216 may be in a first time cycle $t_0$ and the second set of resource block pairs 1220-1226 may be in a second time cycle $t_n$. The location indicating the next resource block pair may be an absolute location within the plurality of resource block pairs or a relative offset with respect to the particular resource block pair.

Figure 16:
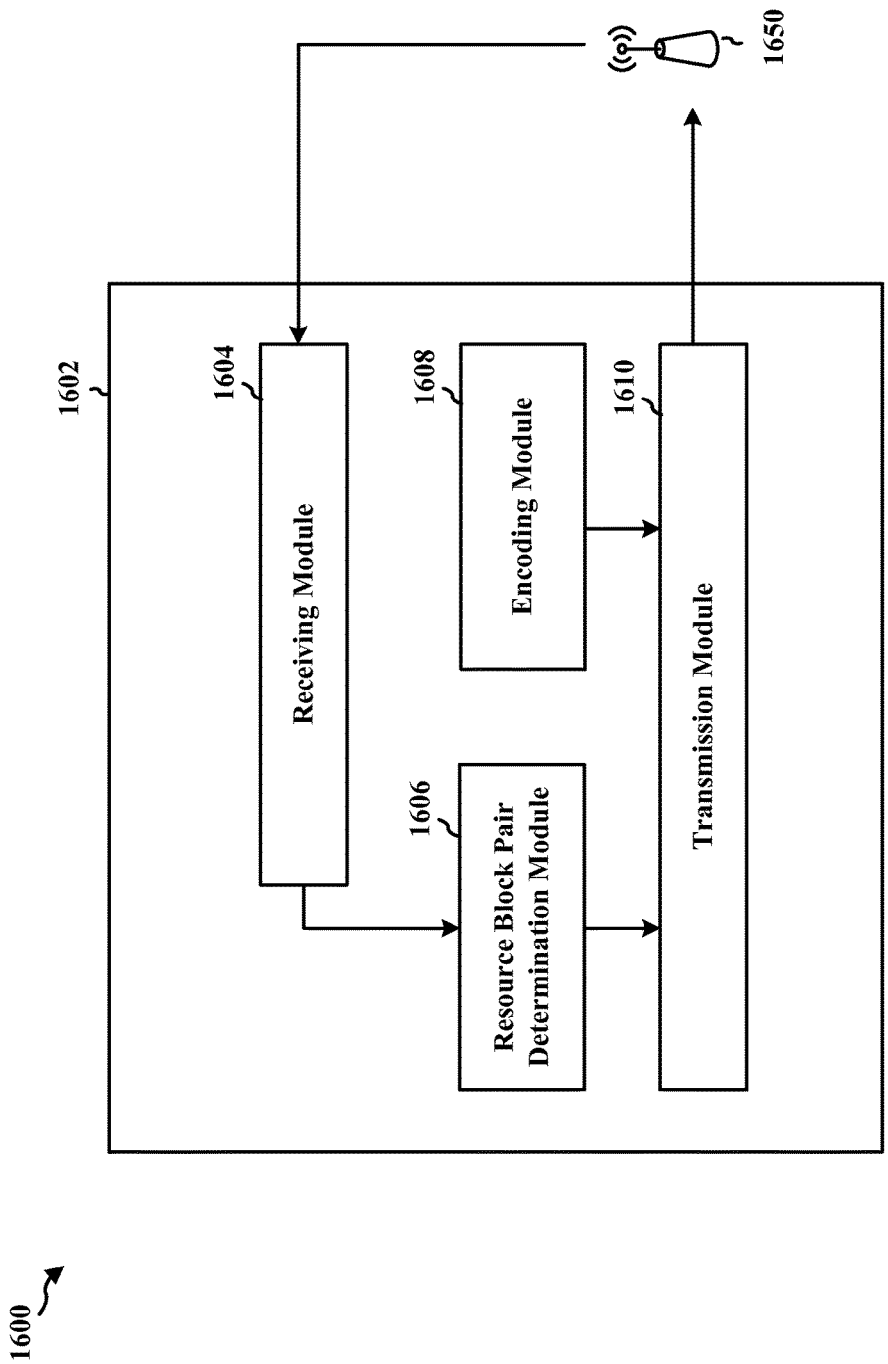
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a UE. The apparatus includes a resource block pair determination module 1606 that is configured to determine a second set of resource block pairs on which to transmit a peer discovery message in a second time cycle based on a mapping of a first set of resource block pairs in a first time cycle to the second set of resource block pairs in the second time cycle. The mapping is a one-to-one mapping between each resource block pair in the first set of resource block pairs to a corresponding resource block pair in the second set of resource block pairs. Resource block pairs in the first set of resource block pairs may be in adjacent allocated resources. The apparatus further includes a transmission module 1610 that is configured to transmit the peer discovery message in the determined second set of resource block pairs. Resource block pairs in the second set of resource block pairs may be in non-adjacent allocated resources. The transmission module 1610 may be configured to send information indicating the determined second set of resource block pairs to a base station. The receiving module 1604 may be configured to receive an indication from the base station whether the determined second set of resource block pairs can be utilized. The resource block pair determination module 1606 may be configured to determine a plurality of sets of resource block pairs in the second time cycle based on a mapping of resource block pairs in the first time cycle to resource block pairs in the second time cycle. The resource block pair determination module 1606 may be configured to determine a received power associated with the plurality of sets of resource block pairs in the second time cycle. The plurality of sets of resource block pairs may include the second set of resource block pairs. The resource block pair determination module 1606 may be configured to determine that the second set of resource block pairs has a received power less than a threshold. The resource block pair determination module 1606 may be configured to determine to transmit the peer discovery message in the second set of resource block pairs upon determining that the second set of resource block pairs has a received power less than the threshold. The second set of resource block pairs may have a lowest received power of the plurality of sets of resource block pairs. The transmission module 1610 may be configured to generate a message based on an order of a particular resource block pair within the second set of resource block pairs. The transmission module 1610 may be configured to transmit information indicating the message with the peer discovery message. The transmission module 1610 may be configured to select a pilot sequence from a plurality of pilot sequences based on the message. The information indicating the message may be the selected pilot sequence and the selected pilot sequence may be transmitted in reference signals within the particular resource block pair carrying the peer discovery message. The message may be transmitted in the particular resource block pair within the peer discovery message.

The resource block pair determination module 1606 may be configured to select a set of resource block pairs for carrying a peer discovery message. The transmission module 1610 may be configured to transmit a peer discovery signal on the set of resource block pairs. The peer discovery signal on a particular resource block pair of the set of resource block pairs includes the peer discovery message and information indicating a location of a next resource block pair. The information indicating the location of the next resource block pair may be a next resource block pair of the set of resource block pairs. The information indicating the location of the next resource block pair may be a next resource block pair of a second set of resource block pairs. The second set of resource block pairs may be in a first time cycle and the set of resource block pairs may be in a second time cycle. The location indicating the next resource block pair may be one of an absolute location within the plurality of resource block pairs or a relative offset with respect to the particular resource block pair. The apparatus may further include an encoding module 1608 that is configured to encode separately information transmitted in each resource block pair in the set of resource block pairs to include the information indicating the location of the next resource block pair.

The apparatus may include additional modules that perform each of the steps of the algorithm in the aforementioned flow charts of FIGS. 13, 14, 15. As such, each step in the aforementioned flow charts of FIGS. 13, 14, 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
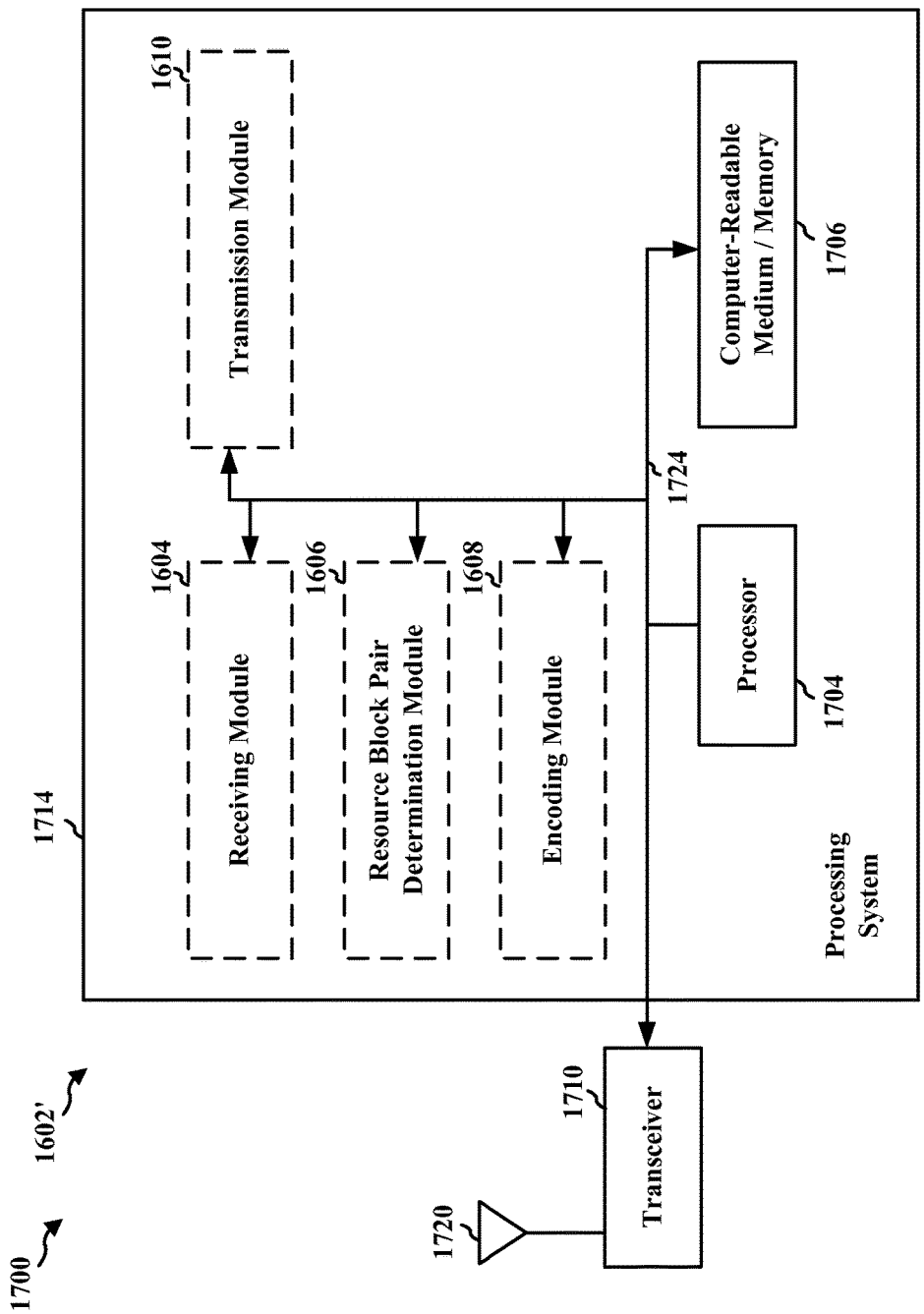
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714. In addition, the transceiver 1710 receives information from the processing system 1714, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, 1608, 1610. The modules may be software modules running in the processor 1704, resident/stored in the computer readable medium/memory 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication is a UE and includes means for determining a second set of resource block pairs on which to transmit a peer discovery message in a second time cycle based on a mapping of a first set of resource block pairs in a first time cycle to the second set of resource block pairs in the second time cycle. The mapping is a one-to-one mapping between each resource block pair in the first set of resource block pairs to a corresponding resource block pair in the second set of resource block pairs. Resource block pairs in the first set of resource block pairs may be in adjacent allocated resources. The apparatus further includes means for transmitting the peer discovery message in the determined second set of resource block pairs. Resource block pairs in the second set of resource block pairs may be in non-adjacent allocated resources. The apparatus may further include means for sending information indicating the determined second set of resource block pairs to a base station, and means for receiving an indication from the base station whether the determined second set of resource block pairs can be utilized. The apparatus may further include means for determining a plurality of sets of resource block pairs in the second time cycle based on a mapping of resource block pairs in the first time cycle to resource block pairs in the second time cycle, and means for determining a received power associated with the plurality of sets of resource block pairs in the second time cycle. The plurality of sets of resource block pairs may include the second set of resource block pairs. The apparatus may further include means for determining that the second set of resource block pairs has a received power less than a threshold, and means for determining to transmit the peer discovery message in the second set of resource block pairs upon determining that the second set of resource block pairs has a received power less than the threshold. The second set of resource block pairs may have a lowest received power of the plurality of sets of resource block pairs. The apparatus may further include means for generating a message based on an order of a particular resource block pair within the second set of resource block pairs, and means for transmitting information indicating the message with the peer discovery message. The apparatus may further include means for selecting a pilot sequence from a plurality of pilot sequences based on the message. The information indicating the message may be the selected pilot sequence and the selected pilot sequence may be transmitted in reference signals within the particular resource block pair carrying the peer discovery message. The message may be transmitted in the particular resource block pair within the peer discovery message.

In one configuration, the apparatus 1602/1602' for wireless communication is a UE and includes means for selecting a set of resource block pairs for carrying a peer discovery message, and means for transmitting a peer discovery signal on the set of resource block pairs. The peer discovery signal on a particular resource block pair of the set of resource block pairs may include the peer discovery message and information indicating a location of a next resource block pair. The information indicating the location of the next resource block pair may be a next resource block pair of the set of resource block pairs. The information indicating the location of the next resource block pair may be a next resource block pair of a second set of resource block pairs. The second set of resource block pairs may be in a first time cycle and the set of resource block pairs may be in a second time cycle. The location indicating the next resource block pair may be one of an absolute location within the plurality of resource block pairs or a relative offset with respect to the particular resource block pair. The apparatus may further include means for encoding separately information transmitted in each resource block pair in the set of resource block pairs to include the information indicating the location of the next resource block pair.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   determining a second set of resource block pairs on which to transmit a peer discovery message in a second time cycle based on a mapping of a first set of resource block pairs in a first time cycle to the second set of resource block pairs in the second time cycle, the mapping being a one-to-one mapping between each resource block pair in the first set of resource block pairs to a corresponding resource block pair in the second set of resource block pairs; and
   transmitting the peer discovery message in the determined second set of resource block pairs, wherein the peer discovery message is transmitted with information indicating a message that is based on an order of a particular resource block pair within the second set of resource block pairs.

2. The method of claim 1, wherein the resource block pairs in the first set of resource block pairs are in adjacent allocated resources.

3. The method of claim 1, wherein resource block pairs in the second set of resource block pairs are in non-adjacent allocated resources.

4. The method of claim 1, further comprising:
   sending information indicating the determined second set of resource block pairs to a base station; and
   receiving an indication from the base station whether the determined second set of resource block pairs can be utilized.

5. The method of claim 1, further comprising:
   determining a plurality of sets of resource block pairs in the second time cycle based on a mapping of resource block pairs in the first time cycle to resource block pairs in the second time cycle;
   determining a received power associated with the plurality of sets of resource block pairs in the second time cycle, the plurality of sets of resource block pairs including the second set of resource block pairs;
   determining that the second set of resource block pairs has a received power less than a threshold; and
   determining to transmit the peer discovery message in the second set of resource block pairs upon determining that the second set of resource block pairs has a received power less than the threshold.

6. The method of claim 1, further comprising:
   generating the message based on an order of a particular resource block pair within the second set of resource block pairs.

7. The method of claim 6, further comprising selecting a pilot sequence from a plurality of pilot sequences based on the message, wherein the information indicating the message is the selected pilot sequence and the selected pilot sequence is transmitted in reference signals within the particular resource block pair carrying the peer discovery message.

8. The method of claim 6, wherein the message is transmitted in the particular resource block pair within the peer discovery message.

9. An apparatus for wireless communication, the apparatus being a user equipment (UE), comprising:
   means for determining a second set of resource block pairs on which to transmit a peer discovery message in a second time cycle based on a mapping of a first set of resource block pairs in a first time cycle to the second set of resource block pairs in the second time cycle, the mapping being a one-to-one mapping between each resource block pair in the first set of resource block pairs to a corresponding resource block pair in the second set of resource block pairs, resource block pairs in the first set of resource block pairs being in adjacent allocated resources; and
   means for transmitting the peer discovery message in the determined second set of resource block pairs, wherein the peer discovery message is transmitted with information indicating a message that is based on an order of a particular resource block pair within the second set of resource block pairs.

10. The apparatus of claim 9, wherein the resource block pairs in the first set of resource block pairs are in adjacent allocated resources.

11. The apparatus of claim 9, wherein resource block pairs in the second set of resource block pairs are in non-adjacent allocated resources.

12. The apparatus of claim 9, further comprising:
means for sending information indicating the determined second set of resource block pairs to a base station; and
means for receiving an indication from the base station whether the determined second set of resource block pairs can be utilized.

13. The apparatus of claim 9, further comprising:
means for determining a plurality of sets of resource block pairs in the second time cycle based on a mapping of resource block pairs in the first time cycle to resource block pairs in the second time cycle;
means for determining a received power associated with the plurality of sets of resource block pairs in the second time cycle, the plurality of sets of resource block pairs including the second set of resource block pairs;
means for determining that the second set of resource block pairs has a received power less than a threshold; and
means for determining to transmit the peer discovery message in the second set of resource block pairs upon determining that the second set of resource block pairs has a received power less than the threshold.

14. The apparatus of claim 9, further comprising:
means for generating the message based on an order of a particular resource block pair within the second set of resource block pairs.

15. The apparatus of claim 14, further comprising means for selecting a pilot sequence from a plurality of pilot sequences based on the message, wherein the information indicating the message is the selected pilot sequence and the selected pilot sequence is transmitted in reference signals within the particular resource block pair carrying the peer discovery message.

16. The apparatus of claim 14, wherein the message is transmitted in the particular resource block pair within the peer discovery message.

17. An apparatus for wireless communication, the apparatus being a user equipment (UE), comprising:
a memory; and
at least one processor coupled to the memory and configured to:
determine a second set of resource block pairs on which to transmit a peer discovery message in a second time cycle based on a mapping of a first set of resource block pairs in a first time cycle to the second set of resource block pairs in the second time cycle, the mapping being a one-to-one mapping between each resource block pair in the first set of resource block pairs to a corresponding resource block pair in the second set of resource block pairs, resource block pairs in the first set of resource block pairs being in adjacent allocated resources; and
transmit the peer discovery message in the determined second set of resource block pairs, wherein the peer discovery message is transmitted with information indicating a message that is based on an order of a particular resource block pair within the second set of resource block pairs.

18. A non-transitory computer-readable medium storing computer executable code, comprising code for:
determining a second set of resource block pairs on which to transmit a peer discovery message in a second time cycle based on a mapping of a first set of resource block pairs in a first time cycle to the second set of resource block pairs in the second time cycle, the mapping being a one-to-one mapping between each resource block pair in the first set of resource block pairs to a corresponding resource block pair in the second set of resource block pairs, resource block pairs in the first set of resource block pairs being in adjacent allocated resources; and
transmitting the peer discovery message in the determined second set of resource block pairs, wherein the peer discovery message is transmitted with information indicating a message that is based on an order of a particular resource block pair within the second set of resource block pairs.

\* \* \* \* \*